Patented Dec. 25, 1923.

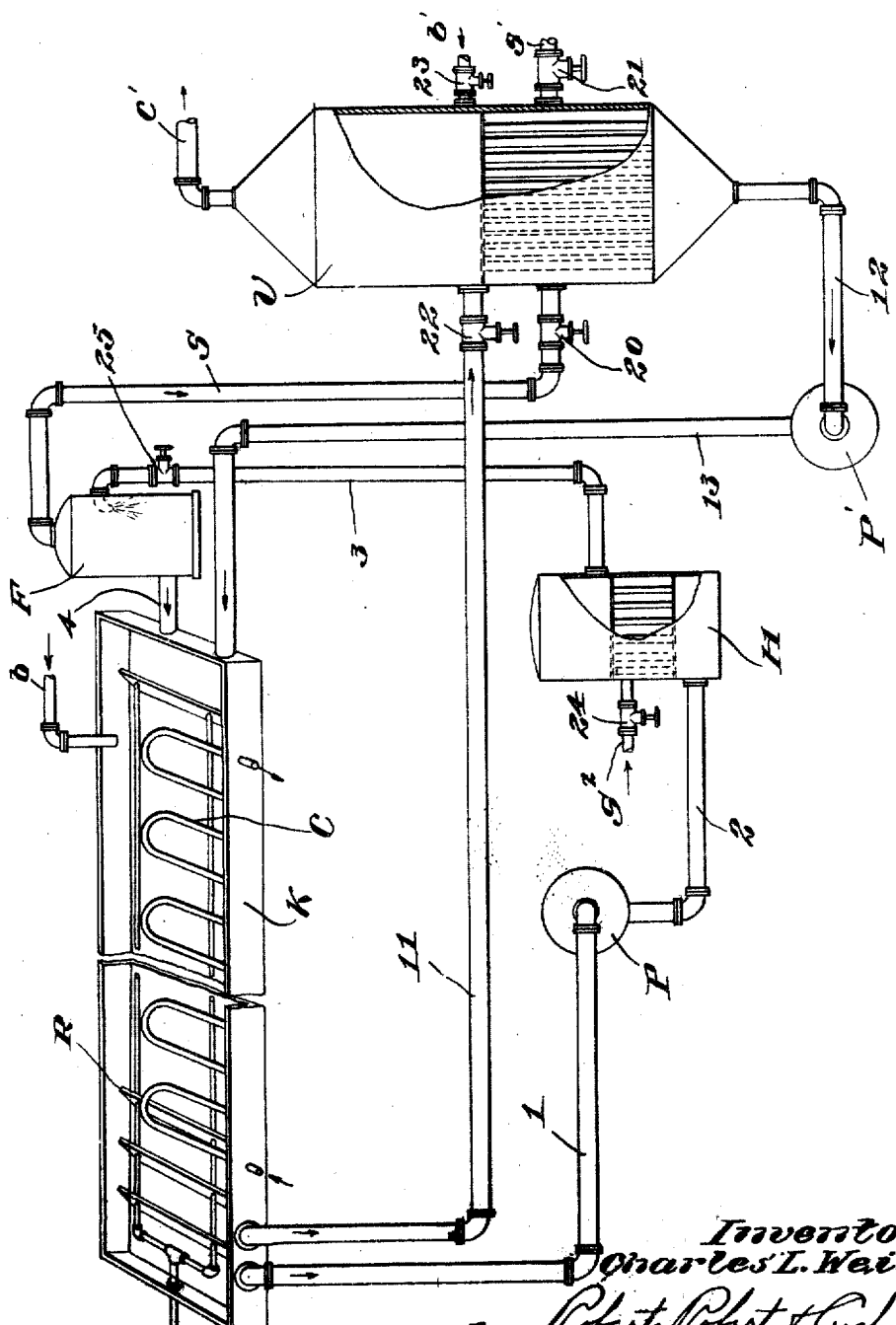

1,478,990

UNITED STATES PATENT OFFICE.

CHARLES L. WEIL, OF PORT HURON, MICHIGAN; ELLA S. WEIL SPECIAL ADMINISTRATRIX OF SAID CHARLES H. WEIL, DECEASED.

SALT MANUFACTURE.

Application filed March 31, 1921. Serial No. 457,436.

*To all whom it may concern:*

Be it known that I, CHARLES L. WEIL, a citizen of the United States, and resident of Port Huron, in the county of Saint Clair and State of Michigan, have invented new and useful Improvements in Salt Manufacture, of which the following is a specification.

For the purpose of meeting the demand in the salt trade the manufacturers produce salts of different degrees of fineness, one salt comprising crystals of one average size, another salt comprising crystals of another average size, etc. In other words the salts on the market are graded according to the size of the crystals thereof. Inasmuch as most systems for manufacturing salt turn out a salt made up of crystals of different sizes, this mixed salt is screened to separate out first the larger crystals, then the intermediate crystals, etc., thereby to produce the salts having the desired degrees of fineness.

According to the usual methods of salt manufacture the quantitive ratios between the different grades (coarse, fine, etc,) are more or less fixed and cannot be varied sufficiently to meet the varying demands throughout the different seasons. Particularly it has been impossible, with the systems heretofore used, to produce a sufficiently large proportion of relatively coarse salt to meet the demand for the coarser grades. For example, salt made by the well-known vacuum-pan method, involving evaporation of brine and the precipitation of the salt in a closed vessel under partial vacuum, is composed substantially wholly of fine crystals. Likewise in an Alberger system, where the brine is superheated and then flashed to precipitate the salt, the crystals produced in the flasher are all small.

Salt made by the common grainer method, which involves heating brine in a shallow pan to precipitate the salt, is not as fine as vacuum-pan or Alberger salt, but it is so soft and flaky that it packs and hardens under unfavorable conditions.

It has been proposed to combine the grainer and vacuum-pan processes by means of a system having a vacuum pan connected to a grainer so that instead of precipitating the salt in the vacuum pan the vacuum pan delivers into the grainer where both vacuum-pan and grainer salt are precipitated, the grainer being heated as usual to evaporate and precipitate independently of the vacuum pan. This system has been said to produce a union between the vacuum-pan and grainer crystals so as to afford salt differing from vacuum-pan salt and also from grainer salt, but at best this union is erratic and leaves too much fine salt which does not unite.

The principal objects of the present invention are to overcome the difficulties incident to the prior systems and to provide a system which is capable of producing a larger proportion of coarse salt and which is adapted readily to vary the relative quantities of the different grades of salt produced, and which at the same time eliminates to a large degree the uneconomical grainer production and is therefore more satisfactory in respect to economy of operation. Another object is to provide a system which, in its installation, is adapted to utilize many elements of apparatus ordinarily used in salt plants, so that old systems can be readily changed over to operate according to the present invention.

In contradistinction to the aforesaid and other prior salt systems and methods the present invention is characterized as follows: Into hot brine, which is substantially saturated, is introduced fine crystals of salt, and these crystals are knitted together by crystallization of the concentrated brine. The hot concentrated brine is preferably produced by circulating brine through a closed circuit (i. e. an endless circuit or complete cycle) and heating the brine in a portion of the circuit in advance of the place where the salt crystals are introduced. The fine crystals may be introduced in various ways, as for example by sprinkling dry crystals into the hot brine while in an open pan, but they are preferably introduced in suspension in saturated brine drawn directly from an ordinary vacuum pan.

More particularly the invention is characterized in that two brines adapted to precipitate crystals of different character respectively, are mixed together in an unheated vessel and cooled, thereby causing the different crystals to knit together and form a built-up salt. The cooling may be effected by normal radiation and the more or less slight evaporation which takes place, but it is preferably effected by artificial means such as cooling pipes. One of the brines has crystals of salt suspended therein, preferably before the brines are mixed, the brine serving merely as a carrier for the crystals in suspension therein; and the other brine preferably has no crystals formed therein until after the brines are mixed, the latter brine merely being concentrated, preferably to the point of saturation.

The crystals suspended in the first brine are knitted together by the salt from the concentrated brine as it crystallizes from the brine during the cooling process. The crystals in the first brine are preferably of vacuum-pan character, that is, either vacuum-pan crystals or similar crystals. For example, the crystals may be formed by flashing as in the Alberger system but this method is less economical. The concentrated brine is preferably formed by superheating and then flashing under such conditions of pressure and temperature that the brine is delivered to the mixing or knitting pan at approximately boiling temperature (226° if operating at atmospheric pressure), and substantially saturated. The vacuum-pan brine or other brine is preferably much cooler at the instant of mixing, say 125° F. when operating at atmospheric pressure in the mixing receptacle or pan.

The mixing or knitting pan is preferably a separate and distinct receptacle, the two brines being first separately treated and these introduced into the mixing pan together.

In the preferred embodiment of the invention, embodying a vacuum pan and a flasher system for producing the brine with crystals in suspension and concentrated brine respectively, the flasher system and vacuum-pan each preferably comprises a complete brine-circulating circuit, the knitting pan being common to the two circuits. Moreover, the vacuum-pan may be, and preferably is, the last element of a multiple effect system.

In order clearly to disclose the nature of the invention the preferred embodiment is shown by way of illustration in the accompanying drawings in which the single figure shows the system diagrammatically.

In the illustrated system, the means for producing the brine containing the small crystals comprises the vacuum-pan V. While this pan is shown conventionally in the drawings, it is to be understood that it ordinarily comprises a chamber having steam pipes extending therethrough or other means for heating the brine contained therein. The vessel is closed and ordinarily connects at the top with a condenser for forming a partial vacuum therein, the condenser connection being indicated in the drawings as C'. As shown in the drawings steam is supplied to the vacuum-pan through the pipe S' controlled by valve 21, the pipe S' connecting with the exhaust of another vacuum pan in multiple-effect operation. Another steam connection is shown at S controlled by valve 20, this connection being used if desired as a secondary source as hereinafter described. Brine may be supplied to the pan V through either pipe 11 or pipe b', these pipes being controlled by valves 22 and 23 respectively. Brine is conducted from the bottom of the pan through pipes 12 and 13, P' representing a centrifugal pump for producing a flow of the brine in the direction of the arrow in pipe 12.

The means for producing the concentrated brine comprises a heater H adapted to receive brine from pipe 2 and to deliver the brine to pipe 3, the heater having steam pipes adapted to receive steam through connection S² controlled by valve 24. The heater H is preferably heated by live steam and preferably heats the brine to a temperature somewhat above the boiling point, for example, about 230° F. The brine from the heater is delivered through pipe 3 to the flasher F where it is permitted to flash, thereby concentrating the brine, the flasher F preferably operating at atmospheric pressure. A valve 25 may be employed in the pipe 3 to regulate the flow and pressure of the brine before it reaches the flasher. A centrifugal pump is indicated at P for producing a circulation of the brine through the heater H and for producing the slight pressure in the heater required to superheat the brine to the desired temperature (230° F. in the example mentioned). The steam produced in the flasher F is preferably employed to heat the vacuum-pan V and the flasher is therefore shown as connecting from the top through pipe S with the steam inlet of the vacuum-pan, thereby affording another multiple effect in addition to the multiple effect obtained by operating a battery of pans V in series. However, it is to be understood that the vacuum-pan may be partially or wholly heated by other steam. For example, the pan V may be the last pan of a multiple effect system such as commonly used in salt plants, in which case the pan receives a part or all of its heating steam or vapor from the preceding pan of the system through connection S' controlled by valve 21 or other suitable connection.

The knitting pan of the system may be either open or closed and of any desired shape and form, but it is preferably an open pan as illustrated at K. If it is desired to cool the brine in the pan K more rapidly than would result from radiation, the cooling pipes C or other suitable cooling means may be employed. When the heated brine is introduced in the pan K at the right-hand end and delivered from the left-hand end, as illustrated in the drawings, the cooling fluid circulated through the pipes C is preferably introduced at the left-hand end and delivered from the right-hand end, as indicated by the arrows, so that the cold fluid entering the pipe will first pass through the cooler portion of the brine in the pan and as it absorbs heat in passing through the pipe C, it will come into hotter brine as it approaches the right-hand end of the pan. In this way the difference between the temperature of the cooling fluid in the pipe C and the surrounding brine may be maintained more nearly constant throughout the length of the pan.

Rakes R are preferably employed in the pan K, rakes of usual construction being shown in the drawings beneath the pipes C. These rakes not only serve to remove the built-up salt which precipitates in the pan, but they also serve to agitate the brine in the pan, thereby effecting a more thorough intermingling of the salt crystals and the saturated brine.

Inasmuch as the preferred form of the invention comprises complete circuits for both brines, such an arrangement has been shown in the figure. The complete circuit of the vacuum-pan brine comprises the pan K, pipe 11, vacuum-pan V, pipe 12, pump P', pipe 13, and thence back to the pan K. The heating and concentrating circuit comprises the pan K, pipe 1, pump P, pipe 2, heater H, pipe 3, flasher F, pipe 4, and thence back to the pan K. Thus the pan K is common to both circuits.

In operation, brine from the vacuum-pan V, carrying salt crystals in suspension, flows to the knitting pan K simultaneously with the inflow of brine from the flasher F, the latter brine preferably being concentrated to the point of saturation but preferably carrying only a small amount, if any, crystals suspended therein. The brine from the flasher F is preferably at least of the order of 50 per cent hotter than the brine from the vacuum-pan V. For example, the flasher brine may be 226° F. when the vacuum-pan brine is 135° F. When the two brines of different temperatures mix upon entering the pan K, the flasher brine is rapidly cooled, thereby causing salt to crystalize therefrom and knit the crystals of the vacuum-pan brine together. This knitting action is augmented by the cooling of the brine in passing through the pan K. To effect this cooling, cooling fluid may be circulated through the pipe C but for certain conditions of operation the brine will cool sufficiently rapidly by radiation in the pan K, the rate of flow through the pan being relatively slow and by evaporation.

To compensate for the evaporation in the system fresh brine may be introduced at one or more suitable points as indicated, for example, at $b$ and $b'$. When introducing brine at $b$ the valve 22 may be entirely closed.

From the foregoing it will be clear that the knitting pan K is not the equivalent of the ordinary grainer pan, inasmuch as grainer pans are always heated, whereas the knitting pan K is unheated and may be artificially cooled. It will also be evident that the flasher circuit comprising the heater H and flasher F preferably produces no salt (except in the pan K) but is merely a heating and concentrating circuit, the brine being only slightly superheated in the heater H and being permitted to flash in the flasher F only a small amount required to bring the brine substantially to the point of saturation.

The salt produced according to the present invention will not readily pack or harden under unfavorable atmospheric conditions, but at the same time the grains are of such character as readily to dissolve in use.

In order to regulate the character of the salt produced, the system may be adjusted in various ways, as for example, by varying the proportions of the two brines introduced in the pan K, varying the temperature of one or both of the brines, varying the temperature of the knitting pan or the rate of cooling therein, varying the degree of concentration of the brine delivered to the knitting pan from the heating and concentration circuit, etc., etc. For example, the knitting action is accelerated and the grains of salt are thereby increased in size by increasing the temperature of the flasher brine relative to the vacuum-pan brine, by accelerating the rate of cooling in the knitting pan, and by increasing the degree of concentration of the flasher brine. An average grade of salt may be produced with the concentrated brine at a temperature of 226° F. and the vacuum-pan brine at 125° F.

A feature of this invention is it economy. While the salt is built-up and precipitated in a cooled pan where there is necessarily considerable waste heat, practically all of the salt is crystallized out (as fine crystals) in the vacuum-pan portion of the system which operates at very high efficiency especially when operating multiple-effect.

The present invention not only eliminates to a large degree the use of the old uneconomical grainers, which have been used in the effort to produce coarser salt, but it is capable of yielding coarse salt in much larger proportion and of better quality.

The invention may be utilized not only to increase the proportion of coarse salt yielded during the precipitation but also to convert fine salt already made into coarser salt. For example, the excess fine salt which has accumulated in a plant owing to lack of demand may be built-up into coarse salt by sprinkling it into a knitting pan operated as herein described.

The term "salt crystals" as herein employed, is not intended to connote individual crystals but rather particles of salt whether composed of individuals crystals or a plurality of individual crystals united together.

I claim:

1. The art of making salt which comprises producing brine containing salt crystals, producing concentrated brine containing substantially no salt crystals, mixing the brines, and cooling the mixed brine to cause said crystals to knit together by the crystallization of salt from said mixed brine.

2. The art of making salt which comprises cooling a heated mixture of brine of vacuum-pan type with brine of a different type to cause the crystals of the two brines to knit together.

3. The art of making salt which comprises producing a solution containing salt crystals, producing a brine whose natural deposit is salt crystals of a different character, and cooling the two brines in intermingled relationship to cause the crystals of the two characters to knit together.

4. The art of making salt which comprises cooling a heated mixture of brine which has been given the vacuum pan type of treatment with brine which has been given the flasher system type of treatment, whereby to cause crystals of the respective brines to knit together.

5. The art of making salt which comprises producing concentrated brines of different types in different receptacles, mixing the brines, and cooling the mixture in another receptacle to cause crystals from the different brines to knit together.

6. The art of making salt which comprises treating brine by the flasher-system, separately treating brine by a system of different character, and mixing the brines, with the flasher-system brine at a higher temperature than the other brine, the flasher-system brine having approximately boiling temperature at the instant of mixing.

7. The art of making salt which comprises treating brine by the flasher-system, treating brine by the vacuum-pan system, and mixing the brines, with the flasher-system brine at approximately the boiling temperature and with the vacuum-pan brine at a much lower temperature.

8. The art of making salt which comprises feeding to a common pan brine from a flasher-system and brine from a vacuum-pan, and cooling the brines in the common pan.

9. The art of making salt which comprises feeding to a common pan brine from a flasher-system at a temperature of the order of 226° and brine from a vacuum-pan at a temperature of the order of 135°, and cooling the brines in the common pan.

Signed by me at Boston, Massachusetts, this twenty-eighth day of March, 1921.

CHAS. L. WEIL.